US008411296B2

(12) United States Patent
Ono

(10) Patent No.: US 8,411,296 B2
(45) Date of Patent: Apr. 2, 2013

(54) IMAGE PROCESSING APPARATUS THAT CAN OUTPUT COPY-FORGERY-INHIBITED PATTERN IMAGE, METHOD FOR CONTROLLING IMAGE PROCESSING APPARATUS, PROGRAM, AND STORAGE MEDIUM

(75) Inventor: Takashi Ono, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/046,492

(22) Filed: Mar. 11, 2011

(65) Prior Publication Data

US 2011/0164288 A1 Jul. 7, 2011

Related U.S. Application Data

(63) Continuation of application No. 11/552,017, filed on Oct. 23, 2006, now Pat. No. 7,929,159.

(30) Foreign Application Priority Data

Nov. 8, 2005 (JP) ................................. 2005-323693

(51) Int. Cl.
H04N 1/40 (2006.01)

(52) U.S. Cl. ........ 358/1.14; 358/3.28; 358/1.9; 358/540

(58) Field of Classification Search ................. 358/1.14, 358/3.28, 1.9, 1.15, 1.16, 1.17, 1.18, 448, 358/540; 399/366
See application file for complete search history.

(56) References Cited

U.S. PATENT DOCUMENTS

| 5,291,243 | A | * | 3/1994 | Heckman et al. | 399/3 |
|---|---|---|---|---|---|
| 6,268,927 | B1 | * | 7/2001 | Lo et al. | 358/1.15 |
| 7,359,087 | B2 | * | 4/2008 | Tanaka | 358/1.9 |
| 7,796,753 | B2 | * | 9/2010 | Alasia et al. | 380/51 |
| 8,059,313 | B2 | * | 11/2011 | Nako | 358/3.28 |
| 2002/0176101 | A1 | * | 11/2002 | Tsunekawa | 358/1.9 |
| 2004/0003289 | A1 | * | 1/2004 | Bhogal et al. | 713/201 |
| 2004/0052401 | A1 | * | 3/2004 | Suzaki | 382/100 |
| 2005/0078974 | A1 | * | 4/2005 | Uchida et al. | 399/81 |
| 2006/0290992 | A1 | * | 12/2006 | Loce et al. | 358/3.28 |

* cited by examiner

Primary Examiner — King Poon
Assistant Examiner — Allen H Nguyen
(74) Attorney, Agent, or Firm — Canon U.S.A., Inc., IP Division

(57) ABSTRACT

An apparatus includes an original-document-attribute determining unit that determines attribute of an original document image, a form-attribute determining unit that determines attribute of a form image, and a compositing unit that performs sequence of compositing of the original document image, a copy-forgery-inhibited pattern image, and the form image, the sequence of compositing being determined based on the determined attribute of the original document image and the determined attribute of the form image.

8 Claims, 12 Drawing Sheets

FIG. 12
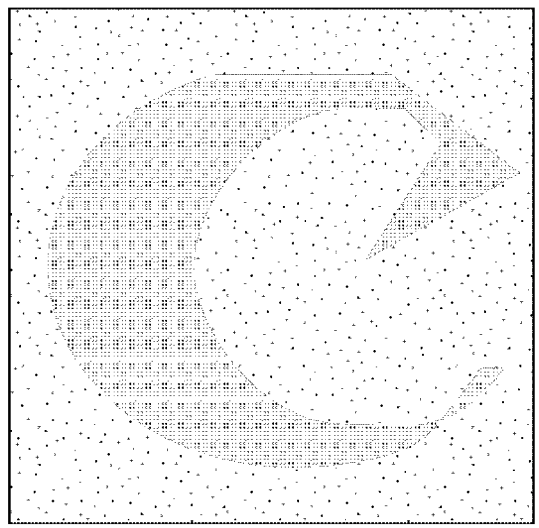
(a)
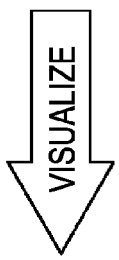
VISUALIZE
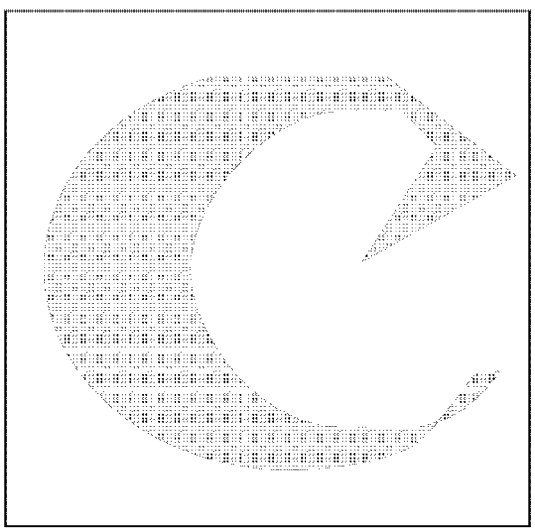
(b)

IMAGE PROCESSING APPARATUS THAT CAN OUTPUT COPY-FORGERY-INHIBITED PATTERN IMAGE, METHOD FOR CONTROLLING IMAGE PROCESSING APPARATUS, PROGRAM, AND STORAGE MEDIUM

CROSS REFERENCE TO RELATED APPLICATIONS

This application is a Continuation of U.S. patent application Ser. No. 11/552,017 filed Oct. 23, 2006, which claims priority to Japanese Patent Application No. 2005-323693 filed Nov. 8, 2005, each of which are hereby incorporated by reference in their entireties.

BACKGROUND OF THE INVENTION

1. Field of the Invention

The present invention relates to an image processing apparatus that can output copy-forgery-inhibited pattern images, a method for controlling the image processing apparatus, a program, and a storage medium.

2. Description of the Related Art

Special paper called security paper exists. A character string (e.g., COPY) may be embedded in security paper such that the character string is not readily visible at a glance. The embedded character string appears clearly on a copy obtained by copying the security paper. Thus, a document prepared using such security paper can be distinguished from a copy of the document with ease. As a result, a person may hesitate to use a copy of the document.

Security paper has such effects and thus is used when, for example, a resident card or a form is made. However, a problem exists in that the cost of security paper is higher than that of ordinary paper.

In view of higher cost associated with security paper, recently, a new technique has become of interest, in which the same effects as with security paper can be achieved using ordinary paper (see Japanese Patent Laid-Open No. 2005-136953). In this technique, original document data and copy-forgery-inhibited pattern image data created with a computer are combined in a printer, and the combined image data containing copy-forgery-inhibited patterns is output on ordinary paper. Character strings and the like are embedded in this copy-forgery-inhibited pattern image. Thus, the embedded character strings appear clearly on a copy obtained by copying the image containing copy-forgery-inhibited patterns. In this technique, ordinary paper is used. Thus, an advantage exists in that the cost of making an original using this technique is cheaper than the cost of making an original using security paper. Furthermore, in this technique, a new copy-forgery-inhibited pattern image can be created every time an original is made. Thus, this technique has another advantage in that the colors, embedded character strings, and the like of a copy-forgery-inhibited pattern image can be freely set up.

A copy-forgery-inhibited pattern image includes an area that is to remain and the other area that is to disappear (or that is pale compared with the area that is to remain) on a copy of the image. The reflection densities of these two areas on the original are substantially the same. Thus, embedded character strings, for example, "COPY", are invisible to the human eye. Here, the term "remain" means that an image on an original is correctly reproduced on a copy of the original, and the term "disappear" means that an image on an original is not reproduced on a copy of the original. The reflection density is measured with a reflection densitometer.

Hereinafter, an area that is to remain on a copy is called a latent-image part, and the other area that is to disappear (or that is pale compared with the area that is to remain) from a copy is called a background-image part.

FIG. 11 is an illustration showing the state of dots in a copy-forgery-inhibited pattern image. In FIG. 11, an area where dots are concentrated is a latent-image part, and the other area where dots are dispersed is a background-image part. The dots in these two areas are generated by different types of dot processing, different types of dither processing, or the like. For example, the dots in the latent-image part are generated by dot processing with a small number of lines, and the dots in the background-image part are generated by dot processing with a large number of lines. Alternatively, the dots in the latent-image part may be generated using a clustered-dot ordered dither matrix, and the dots in the background-image part may be generated using a dispersed-dot ordered dither matrix.

The reproduction capability of a copying machine depends on the input resolution and output resolution of the copying machine. Thus, there is a limit to the reproduction capability of a copying machine. Accordingly, in general, when the size of each of dots in the latent-image part of a copy-forgery-inhibited pattern image is larger than the size of a dot that can reproduced by a copying machine and when the size of each of dots in the background-image part of the copy-forgery-inhibited pattern image is smaller than the size of the dot that can reproduced by the copying machine, the dots in the latent-image part are reproduced on a copy, and the dots in the background-image part are hardly reproduced. Consequently, the color of the latent-image part reproduced on the copy is deeper than the color of the background-image part. Hereinafter, the term "visualization" is used to describe a process in which embedded character strings, symbols and the like appear clearly on a copy by reproducing the latent-image part on the copy so that the color of the latent-image part is deeper than the color of the background-image part.

Parts (a) and (b) of FIG. 12 show visualization. FIG. 12 schematically shows that concentrated dots (large dots) are reproduced on a copy, and dispersed dots (small dots) are not correctly reproduced on the copy.

A copy-forgery-inhibited pattern image is not limited to that described above and can take other forms so long as a character string (e.g., COPY) or a symbol appears clearly (is visualized) on a copy so that it can be recognized by a person. Even when a character string (COPY), is white and the area surrounding the character string becomes visible on a copy, the purpose can be achieved. In this case, an area that includes the character string (COPY) is called a background-image part. And, the area surrounding the character string is called a latent-image part.

In the technique disclosed in Japanese Patent Laid-Open No. 2005-136953, when an original document image includes an image that is fully painted with one color, for example, white, a copy-forgery-inhibited pattern image is overlaid on the original document image. This operation prevents a copy-forgery-inhibited pattern image from being concealed by an image that is fully painted with one color, for example, white, and disappearing. When an original document image does not include an image that is fully painted with one color, the original document image is overlaid on a copy-forgery-inhibited pattern image. This operation prevents a copy-forgery-inhibited pattern image from deteriorating the quality of an original document image.

Furthermore, another technique is disclosed in Japanese Patent Laid-Open No. 2005-136953, in which, in addition to determining whether an original document image includes an image that is fully painted with one color, for example, white, it is determined on the basis of the proportion of the image that is fully painted with one color in the original document image whether image compositing is performed so that one of the corresponding images overwrites another image, or image compositing is performed by performing an OR operation (logical disjunction operation) on the images.

In the techniques disclosed in Japanese Patent Laid-Open No. 2005-136953, the most appropriate method for combining a copy-forgery-inhibited pattern image and an original document image is determined, and a composite image is generated. However, it is not assumed that image compositing is performed when a form image exists in addition to a copy-forgery-inhibited pattern image and an original document image. Thus, a method for most appropriately combining these three types of image is desired.

SUMMARY OF THE INVENTION

An apparatus according to an aspect of the present invention includes an original-document-attribute determining unit that determines attribute of an original document image, a form-attribute determining unit that determines attribute of a form image, and a compositing unit that performs sequence of compositing of the original document image, a copy-forgery-inhibited pattern image, and the form image, the sequence of compositing being determined based on the determined attribute of the original document image and the determined attribute of the form image.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 shows a copy-forgery-inhibited pattern image in part (a) and a visualized copy-forgery-inhibited pattern image in part (b).

DESCRIPTION OF THE EMBODIMENTS

First Exemplary Embodiment

A first exemplary embodiment according to the present invention will now be described in detail with reference to the drawings.

Figure 1:
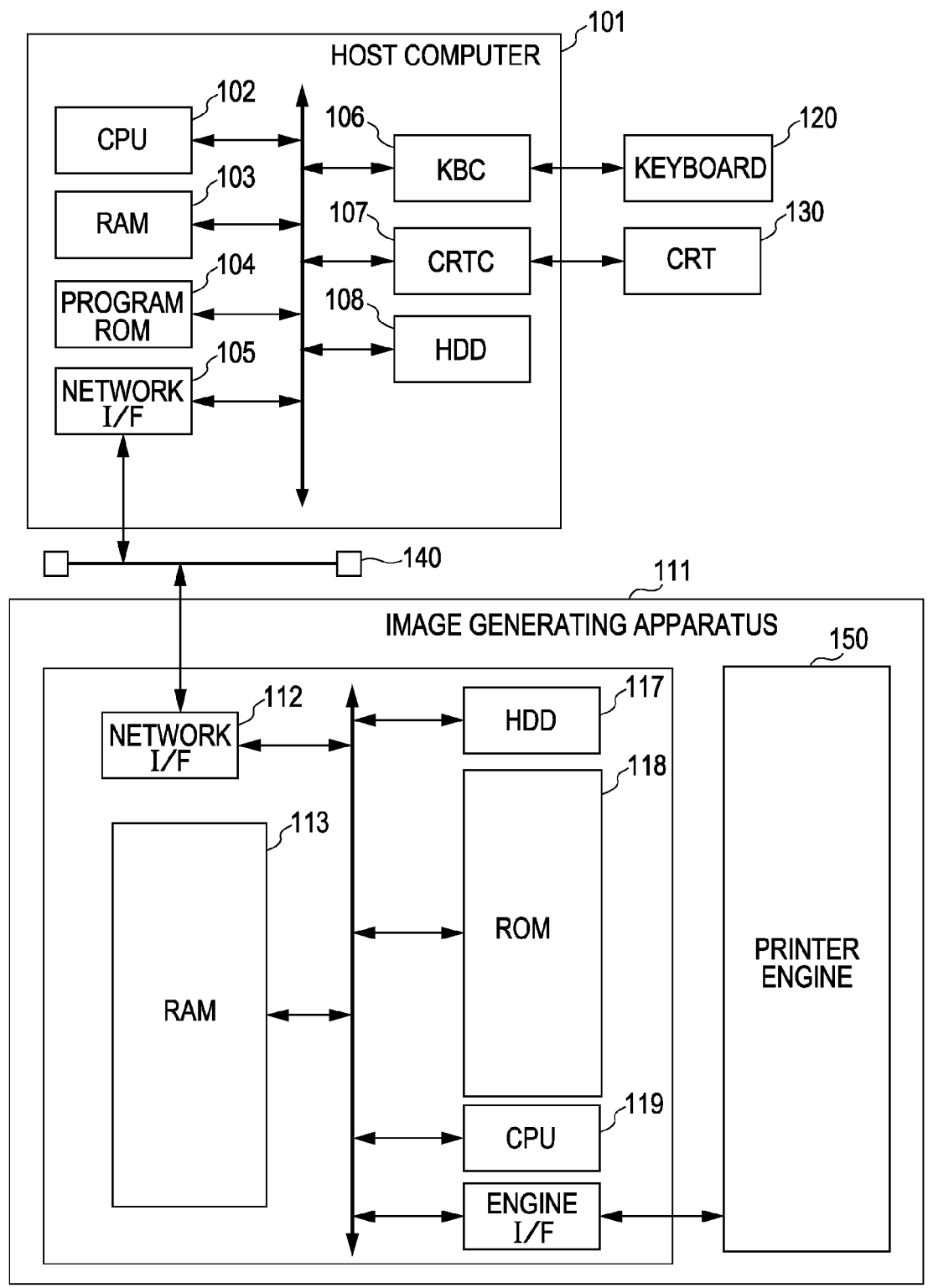
FIG. 1 is an illustration showing a host computer and an image generating apparatus according to an embodiment of the present invention.

FIG. 1 is a block diagram showing the structure of an exemplary system according to an embodiment of the present invention.

Description of Image Generating Apparatus

An image generating apparatus 111 will first be described.

A network interface (I/F) 112 transfers data to and from a device, for example, a host computer 101 connected to a network 140. The image generating apparatus 111 receives PDL data from the host computer 101 via the network 140.

A random access memory (RAM) 113 temporarily stores various types of data, for example, PDL data received via the network I/F 112 and intermediate code data generated from the PDL data. The RAM 113 further stores bitmap data generated from the intermediate code data. The RAM 113 also serves as a work memory of a central processing unit (CPU) 119.

A read only memory (ROM) 118 stores control code of the CPU 119. The CPU 119 reads the code stored in the ROM 118 as necessary and performs various types of processing following the control procedure described in the code.

An engine I/F outputs bitmap data stored in the RAM 113 or a hard disk drive (HDD) 117 to a printer engine 150. The printer engine 150 forms a latent image on a photoconductor drum and transfers and fixes the latent image to paper to print the image.

Description of Host Computer

The host computer 101 will now be described.

The host computer 101 includes a program ROM 104 and an HDD 108 that is a mass storage unit. The program ROM 104 and the HDD 108 store various types of program, for example, a document processing program. A CPU 102 performs overall control of processes performed on the host computer 101 according to these programs. The CPU 102 also performs overall control of components connected to a system bus. The program ROM 104 or the HDD 108 stores an operating system (OS) serving as the control program of the CPU 102 and the like. A RAM 103 functions as a main memory, a work area, and the like of the CPU 102. A keyboard controller (KBC) 106 controls input from a keyboard 120 or a pointing device (not shown). A cathode-ray tube controller (CRTC) 107 controls display on a CRT display 130. A network I/F 105 is connected to the image generating apparatus 111 via the network 140 and performs communication control.

Flow of Copy-Forgery-Inhibited Pattern Printing Process

Figure 2:
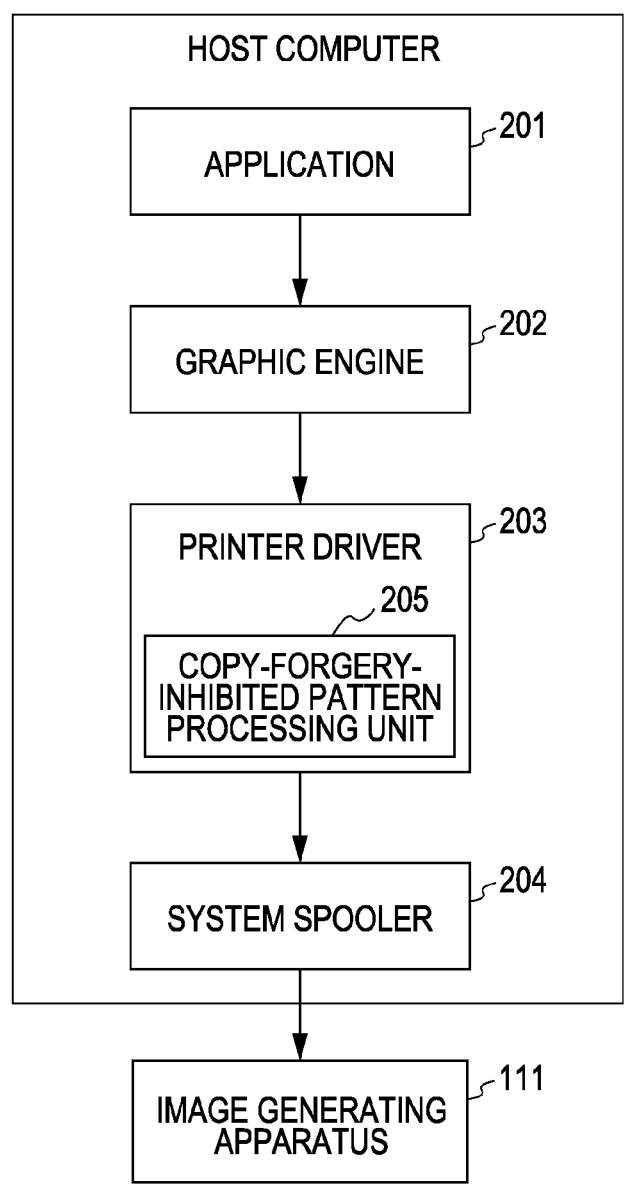
FIG. 2 is an illustration showing software modules related to the process in which an original document image is generated in the host computer and sent to the image generating apparatus according to an embodiment of the present invention.

The copy-forgery-inhibited pattern printing process in the host computer 101 shown in FIG. 1 will now be described with reference to a flowchart in FIG. 2.

An application 201, a graphic engine 202, a printer driver 203, and a system spooler 204 are stored in the HDD 108 as files. These components are program modules that are loaded into the RAM 103 and executed by, for example, an OS. The application 201 and the printer driver 203 can be installed in the HDD 108 via a floppy disk (FD) (now shown), a compact disk-ROM (CD-ROM) (not shown), or a network (not shown).

The process flow of copy-forgery-inhibited pattern printing will now be described. The application 201 stored in the HDD 108 is loaded into the RAM 103 and executed. A user opens user interfaces of the printer driver 203 via the application 201 to interactively perform copy-forgery-inhibited pattern print setting through dialogs 301 and 401.

The application 201 generates graphic device interface (GDI) functions and transfers these functions to the graphic engine 202. At this point, the graphic engine 202 has been loaded into the RAM 103 so as to be executable.

The graphic engine 202 loads the printer driver 203 from the HDD 108 into the RAM 103. The graphic engine 202 also transforms the received GDI functions into device driver interface (DDI) functions and transfers the DDI functions to the printer driver 203.

The printer driver 203 transfers copy-forgery-inhibited pattern print settings to a copy-forgery-inhibited pattern processing unit 205 included in the printer driver 203. That is to say, the printer driver 203 transforms copy-forgery-inhibited pattern print settings into parameters that can be interpreted by the copy-forgery-inhibited pattern processing unit 205 and transfers the parameters to the copy-forgery-inhibited pattern processing unit 205.

The copy-forgery-inhibited pattern processing unit 205 performs the process of drawing a copy-forgery-inhibited pattern image, which is described below, and the like to generate the copy-forgery-inhibited pattern image. The copy-forgery-inhibited pattern processing unit 205 may be a built-in module of the printer driver 203 or a library module that is individually installed.

The printer driver 203 generates control commands (for example, PDL data) that can be interpreted by a printer, upon receiving the GDI functions and the copy-forgery-inhibited pattern image, on the basis of these pieces of data.

The printer driver 203 sends the generated commands to the system spooler 204. At this point, the system spooler 204 has been loaded into the RAM 103 by the OS.

The system spooler 204 outputs the received commands to the image generating apparatus 111 via the network I/F 105.

The process of copy-forgery-inhibited pattern print setting will now be described.

Screen for Copy-Forgery-Inhibited Pattern Print Setting

Figure 3:
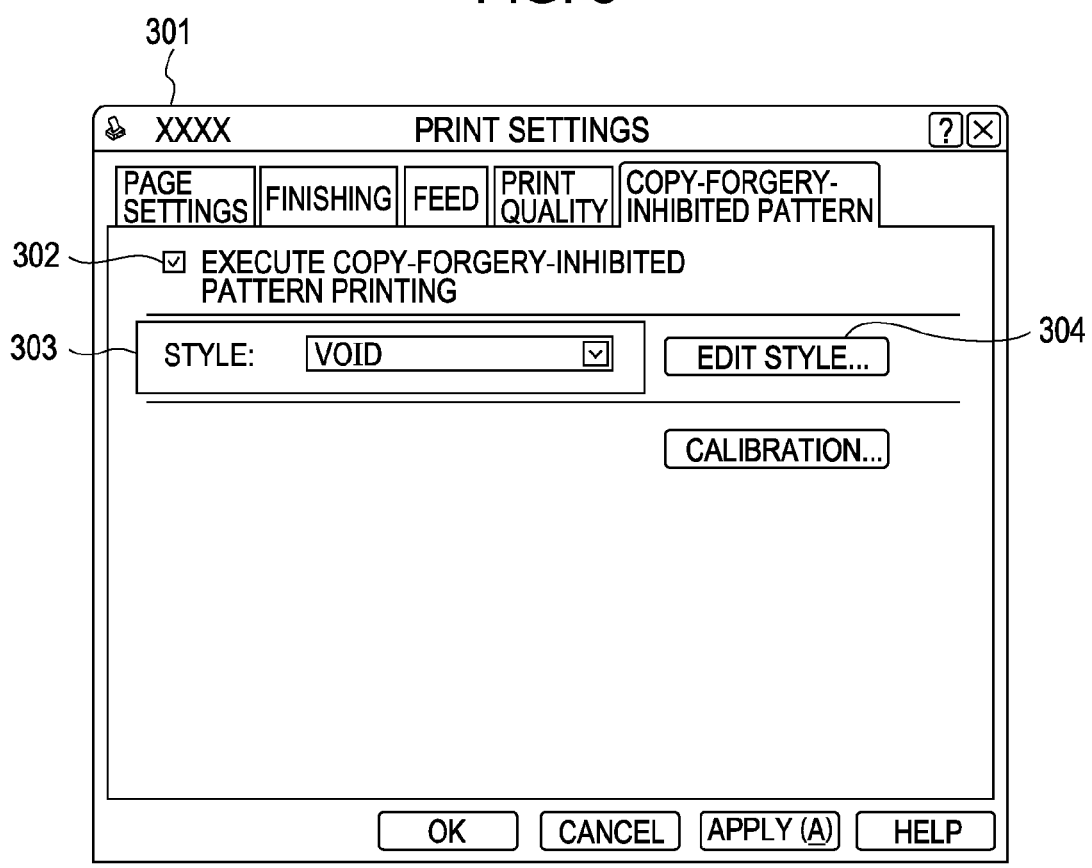
FIG. 3 is a printer driver screen for copy-forgery-inhibited pattern printing according to an embodiment of the present invention.
Figure 4:
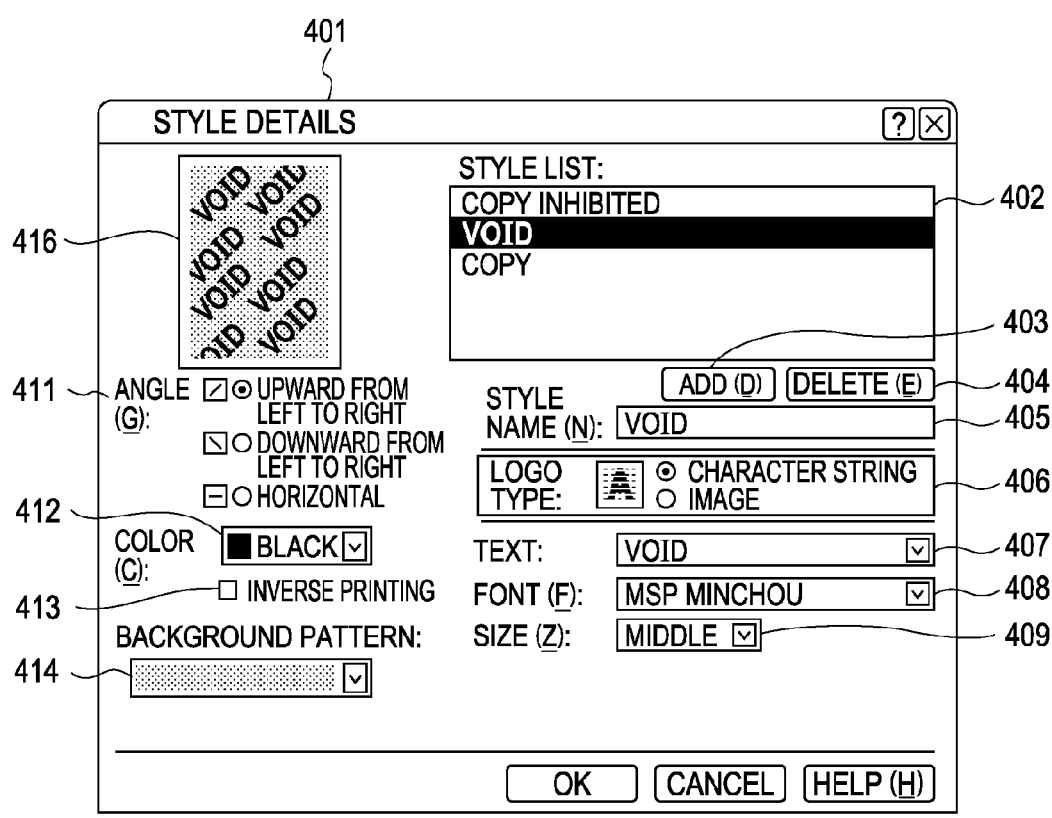
FIG. 4 is a printer driver screen for editing a style of a copy-forgery-inhibited pattern according to an embodiment of the present inventions.

The copy-forgery-inhibited pattern print setting process is performed by the user through the user interfaces shown in FIGS. 3 and 4. The copy-forgery-inhibited pattern print settings specified by the user are interpreted by the copy-forgery-inhibited pattern processing unit 205 under the control of the CPU 102, and the process corresponding to the interpretation is performed.

FIGS. 3 and 4 are illustrations showing exemplary user interfaces that are used to configure copy-forgery-inhibited pattern print settings according to an embodiment of the present invention. The data related to these screens is stored in, for example, the HDD 108. Thus, when these screens are displayed, the data is temporarily loaded into the RAM 103 and then sent to the CRT display 130 via the CRTC 107.

FIG. 3 shows an exemplary initial screen for configuring copy-forgery-inhibited pattern print settings.

On the screen (the dialog 301) shown in FIG. 3, the user can configure copy-forgery-inhibited pattern print settings. In a check box 302, the user can specify whether copy-forgery-inhibited pattern printing (a function of combining a copy-forgery-inhibited pattern image and an original document image and outputting a composite image) is executed. In an area 303, the user can specify style information that represents data on various types of copy-forgery-inhibited pattern print settings by an identifier (a style). Individual pieces of style information are registered in a registry (not shown). When the user has pressed a button 304, the dialog 401 for editing styles shown in FIG. 4 is displayed. The copy-forgery-inhibited pattern print settings specified by the user through this screen are stored in the RAM 103 as necessary.

FIG. 4 shows an exemplary screen for configuring copy-forgery-inhibited pattern print settings in detail.

Figure 11:
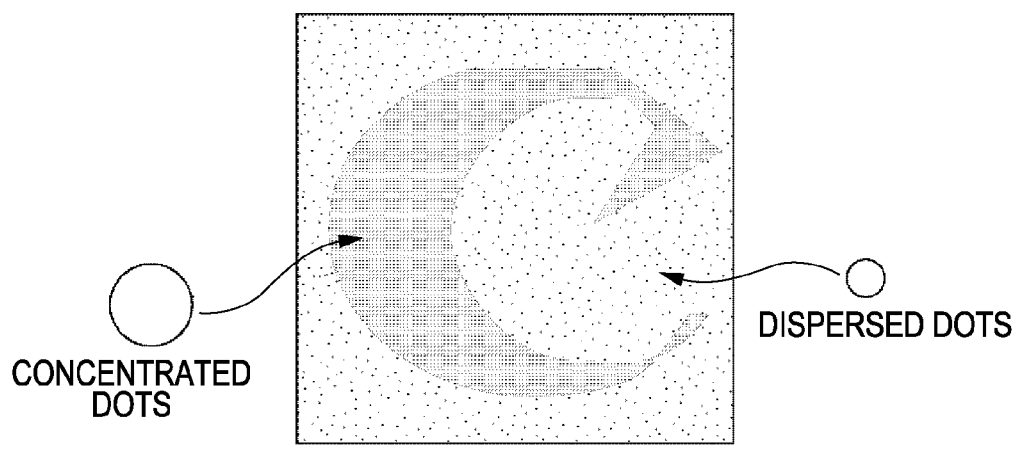
FIG. 11 is an illustration showing a copy-forgery-inhibited pattern image.

On the screen (the dialog 401 for editing styles) shown in FIG. 4, the user can configure copy-forgery-inhibited pattern print settings in detail. A copy-forgery-inhibited pattern image is displayed in an area 416. A list of styles the user can select is displayed in an area 402. A style is added by pressing a button 403 and deleted by pressing a button 404. The name of a currently selected style is displayed in an area 405. The user can select as a type of latent image, the character string "C" shown in FIG. 11, by using radio buttons 406. When the user selects a character-string option by means of the radio buttons 406, a text object can be used as the latent image. When the user selects an image option by using the radio buttons 406, image data, for example, bitmap (BMP), can be used as the latent image. On the screen (the dialog 401 for editing styles) shown in FIG. 4, since the character-string option is selected by using the radio buttons 406, data on settings related to an text object is displayed in areas 407, 408, and 409. In this way, in the present exemplary embodiment, the user selects a character string or image data as a type of latent image. The character string selected as the latent image is displayed and edited in an area 407. The font information of the character string is displayed and edited in an area 408. In the present exemplary embodiment, only a font name is displayed in the area 408. The font size of the character string is displayed and edited in an area 409. In the present exemplary embodiment, the user can select one of large, middle, and small sizes as the font size. Alternatively, a general method for specifying a font size may be adapted. The angle of the latent image can be specified by using radio buttons 411. In the present exemplary embodiment, the user can select one of upward from left to right, downward from left to right, and horizontal as the angle. Alternatively, another arrangement may be adapted, in which, for example, the user can freely specify an angle or specify an angle by using a slider bar. The color of the copy-forgery-inhibited pattern image is displayed and edited in an area 412. A latent-image part and a background-image part of the copy-forgery-inhibited pattern image can be interchanged by using a check box 413. When the check box 413 is not selected, a latent-image part that appears clearly on a copy corresponds to the latent image, for example, "VOID". That is to say, when the check box 413 is not selected, the reflection density of the character string, for example, "VOID", that appears on a copy is higher than that of an area surrounding the character string. On the other hand, when the check box 413 is selected, a background-image part that appears pale on a copy corresponds to the latent image, for example, "VOID". That is to say, when the check box 413 is selected, the character string, for example, "VOID", is inverse-printed on a copy. In an area 414, the user can specify a camouflage image for rendering an existing copy-forgery-inhibited pattern image illegible to the human eye. The user can select one pattern from among a plurality of patterns of camouflage images. The user may not use a camouflage image. The copy-forgery-inhibited pattern print settings specified by the user through the screen shown in FIG. 4 are stored in the RAM 103 as necessary.

Screen for Form Overlay Print Setting

Figure 5:
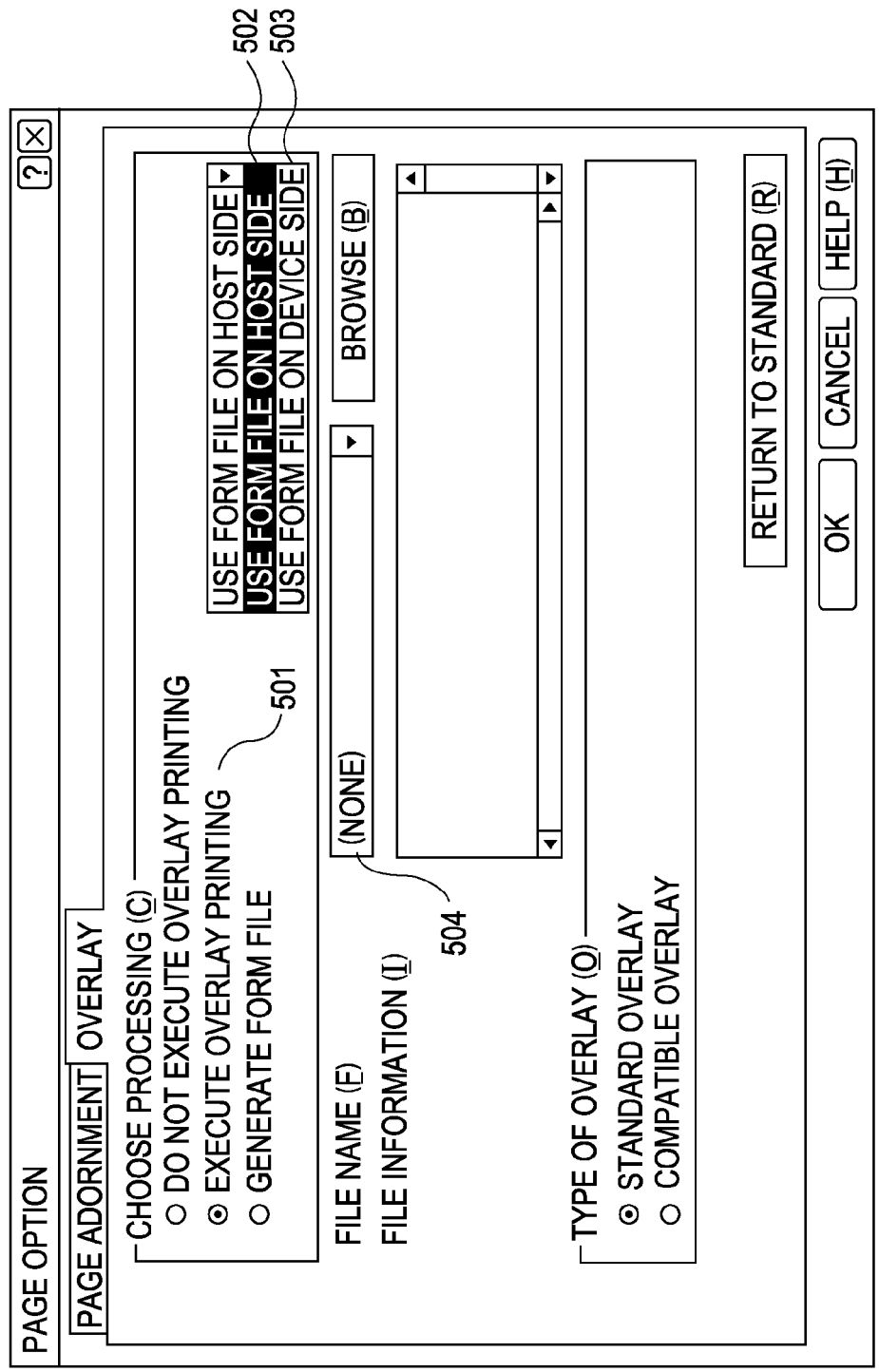
FIG. 5 is a printer driver screen for executing form overlay according to an embodiment of the present invention.

FIG. 5 shows an exemplary screen for configuring form overlay print settings in the host computer 101. Form overlay printing is a function of combining an original document image and a form image and outputting a composite image.

The user can specify whether overlay printing is executed by using a radio button 501. When the user has specified that overlay printing is executed by using the radio button 501, selection areas pop up, in which the user can select one form image to be used from among form images stored in different storage media, as shown in areas 502 and 503. At this point, when the user has selected the area 502, a screen appears, on which the user can select a form image stored in, for example, the HDD 108 in the host computer 101. On this screen, the user can select PDL data as a form image. When the user has selected the area 503, a screen appears, on which the user can select a form image stored in, for example, the HDD 117 in the image generating apparatus 111. On this screen, in addition to PDL data, the user can select bitmap data as a form image. The user can input the name of a form image in an area 504. It is determined by inputting the name of a form image in the area 504 which form image overlays a corresponding original document image.

Figure 6:
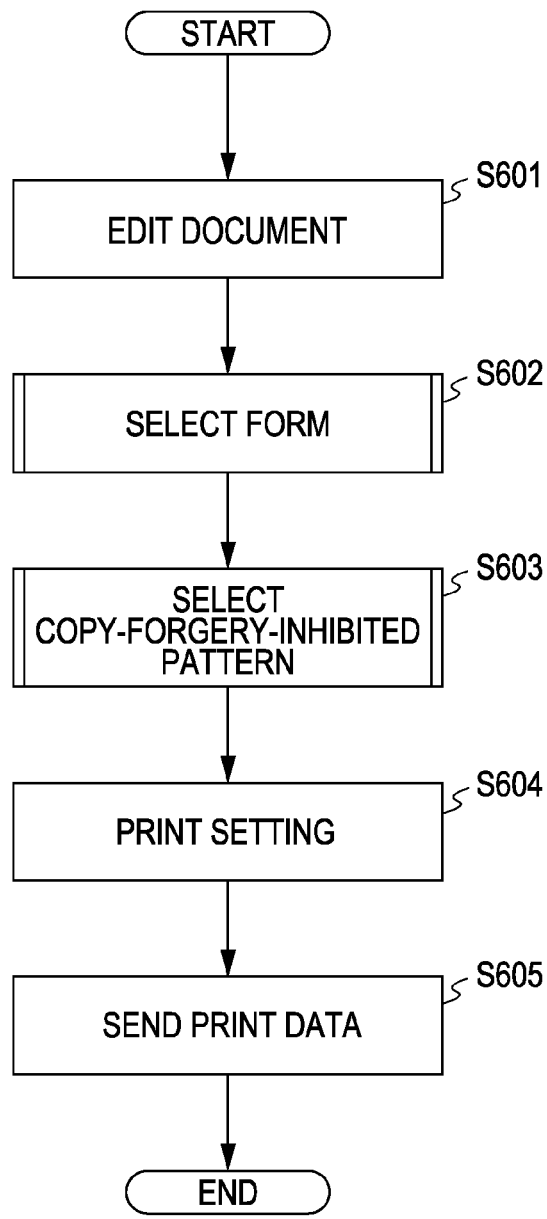
FIG. 6 is a flowchart showing form overlay print setting and copy-forgery-inhibited pattern print setting according to an embodiment of the present invention.

Flow of Form and Copy-Forgery-Inhibited Pattern Printing Process in Host Computer FIG. 6 is a flowchart showing the flow of form and copy-forgery-inhibited pattern printing process according to the present exemplary embodiment in the host computer 101.

In step S601, the user starts up the application 201 for editing documents and edits an original document image by using the keyboard 120 and the like. The edited original document image is transformed into DDI functions by the graphic engine 202.

In step S602, the user selects a form image to be combined with the original document image on the driver screen shown in FIG. 5. The printer driver 203 links the selected form image stored in the host computer 101 or the image generating apparatus 111 to the original document image.

In step S603, the user selects a copy-forgery-inhibited pattern image to be combined with the original document image on the driver screens shown in FIGS. 3 and 4. The copy-forgery-inhibited pattern processing unit 205 links the selected copy-forgery-inhibited pattern image to the original document image.

In step S604, the user configures print settings, for example, a predetermined print layout and paper size. The printer driver 203 links the configured print settings to the original document image.

In step S605, the printer driver 203 transforms the original document image and the copy-forgery-inhibited pattern image to individual pieces of PDL data, attaches the print settings and the like to the pieces of PDL data, and then sends the output to the image generating apparatus 111 via the network I/F 105. When the selected form image is stored in the host computer 101, this form image is also transformed into a piece of PDL data. When the selected form image is stored in the image generating apparatus 111, the file name of this form image is added to the print settings attached to the pieces of PDL data.

Figure 7:
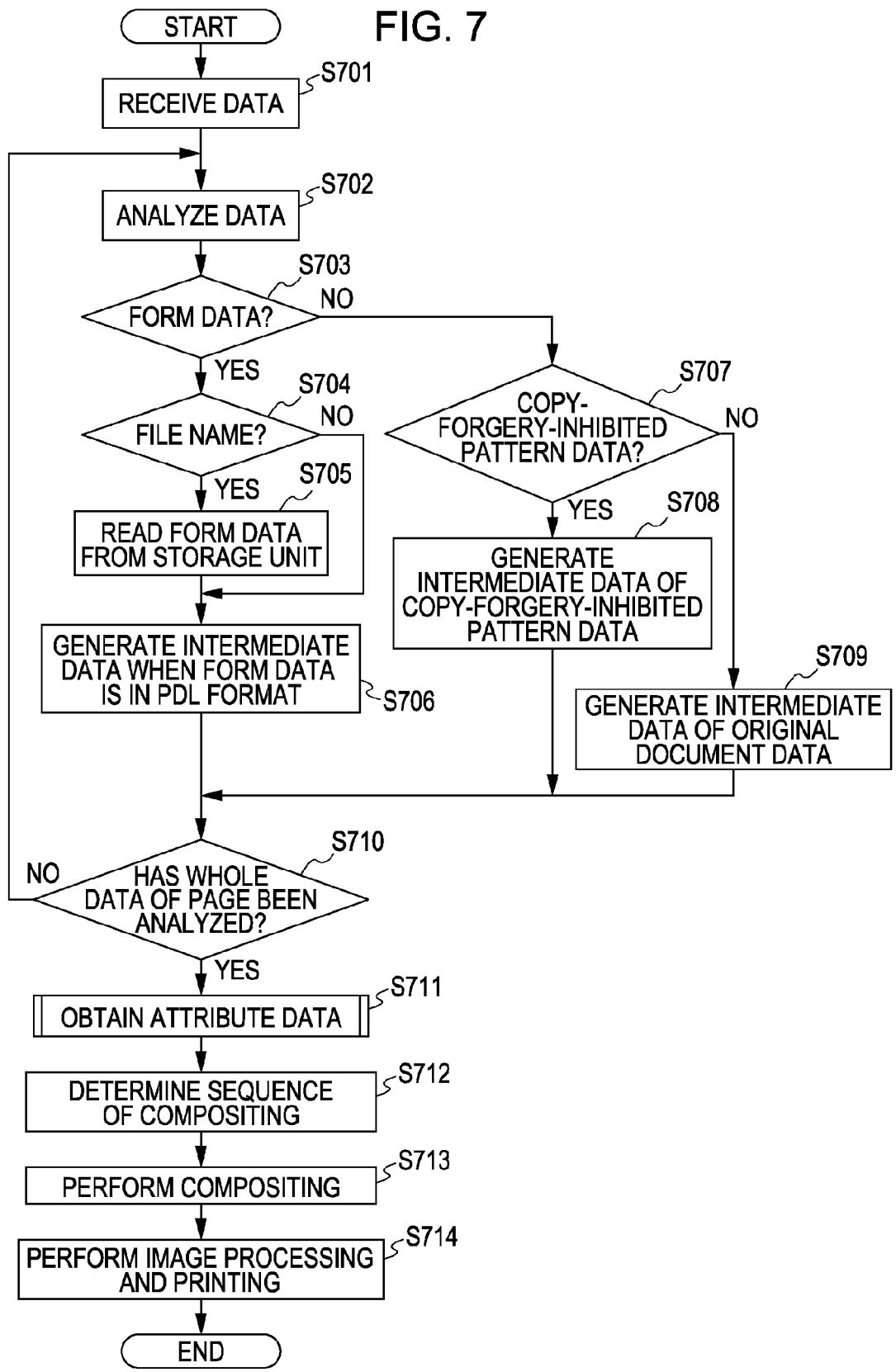
FIG. 7 is a flowchart showing a process that is performed on page description language (PDL) data received from the host computer by the image generating apparatus according to an embodiment of the present invention.

Flow of Form and Copy-Forgery-Inhibited Pattern Printing Process in Image Generating Apparatus FIG. 7 is a flowchart showing a process performed in the image generating apparatus 111 according to an embodiment of the present invention.

In step S701, the image generating apparatus 111 receives pieces of PDL data via the network I/F 112. The pieces of PDL data are stored in the RAM 113.

In steps S702 to S710, the type of each piece of PDL data stored in the RAM 113 is analyzed, and a piece of intermediate data is generated from each piece of PDL data. That is to say, it is determined whether the piece of PDL data to be processed is a form image, a copy-forgery-inhibited pattern image, or an original document image, and then the piece of PDL data is transformed into a piece of intermediate data.

In step S702, analysis is performed to determine whether the piece of data to be processed is a form image, a copy-forgery-inhibited pattern image, or an original document image.

In step S703, it is determined whether the piece of data to be processed is data related to a form image. When it is determined that the piece of data to be processed is a form image, the process proceeds to step S704. Otherwise, the process proceeds to step S707.

In step S704, it is determined whether the piece of data to be processed, which is data related to a form image, is a file name. That is to say, it is determined whether the corresponding form image is a form image stored in the image generating apparatus 111 or a form image stored in the host computer 101. When it is determined that the piece of data to be processed is a file name, the process proceeds to step S705. Otherwise, the process proceeds to step S706.

In step S705, a form image stored in a storage unit, for example, the HDD 117 in the image generating apparatus 111 is read out. The form image may be in the bitmap format or the PDL format.

In step S706, when the form image is in the PDL format, the form image is transformed into a piece of intermediate data. When the form image is in the bitmap format, no processing is performed in step S706. After step S706, the process proceeds to step S710.

In step S707, it is determined whether the piece of data to be processed is a copy-forgery-inhibited pattern image. When it is determined that the piece of data to be processed is a copy-forgery-inhibited pattern image, the process proceeds to step S708. Otherwise, it is determined that the piece of data to be processed is an original document image, and the process proceeds to step S709.

In step S708, a copy-forgery-inhibited pattern image in the PDL format is transformed into a piece of intermediate data. Then, the process proceeds to step S710.

In step S709, an original document image in the PDL format is transformed into a piece of intermediate data. Then, the process proceeds to step S710.

In step S710, it is determined whether all pieces of data in a page to be processed have been analyzed. When it is determined that all pieces of data have been analyzed, the process proceeds to step S711. Otherwise, the process goes back to step S702.

In step S711, when each of the images in the page to be processed is a piece of intermediate data of an original document image or a piece of intermediate data of a form image, attribute data of individual pixels in the corresponding image is obtained from an object existing in the piece of intermediate data. Here, the attribute data represents the type of image that includes the pixels. Types of attribute data include, but are not limited to, image attribute and graphic attribute, each representing a type of image that is fully painted with one color, and line attribute and character attribute, each representing a type of image that is not fully painted with one color. It is determined that the attribute of an image that includes at least one pixel having image attribute or graphic attribute is the primary attribute, and the attribute of an image that includes no pixel having image attribute or graphic attribute is the secondary attribute.

In step S712, the process of determining the sequence of compositing, which is described below in detail, is performed.

In step S713, compositing is performed on the basis of the sequence of compositing determined in step S712. The compositing performed in step S713 is described below in detail.

In step S714, a suitable image processing is performed on the combined data, and the resulting image data is output to the printer engine 150 via the engine I/F.

Details of Process of Determining Sequence of Compositing

Figure 8:
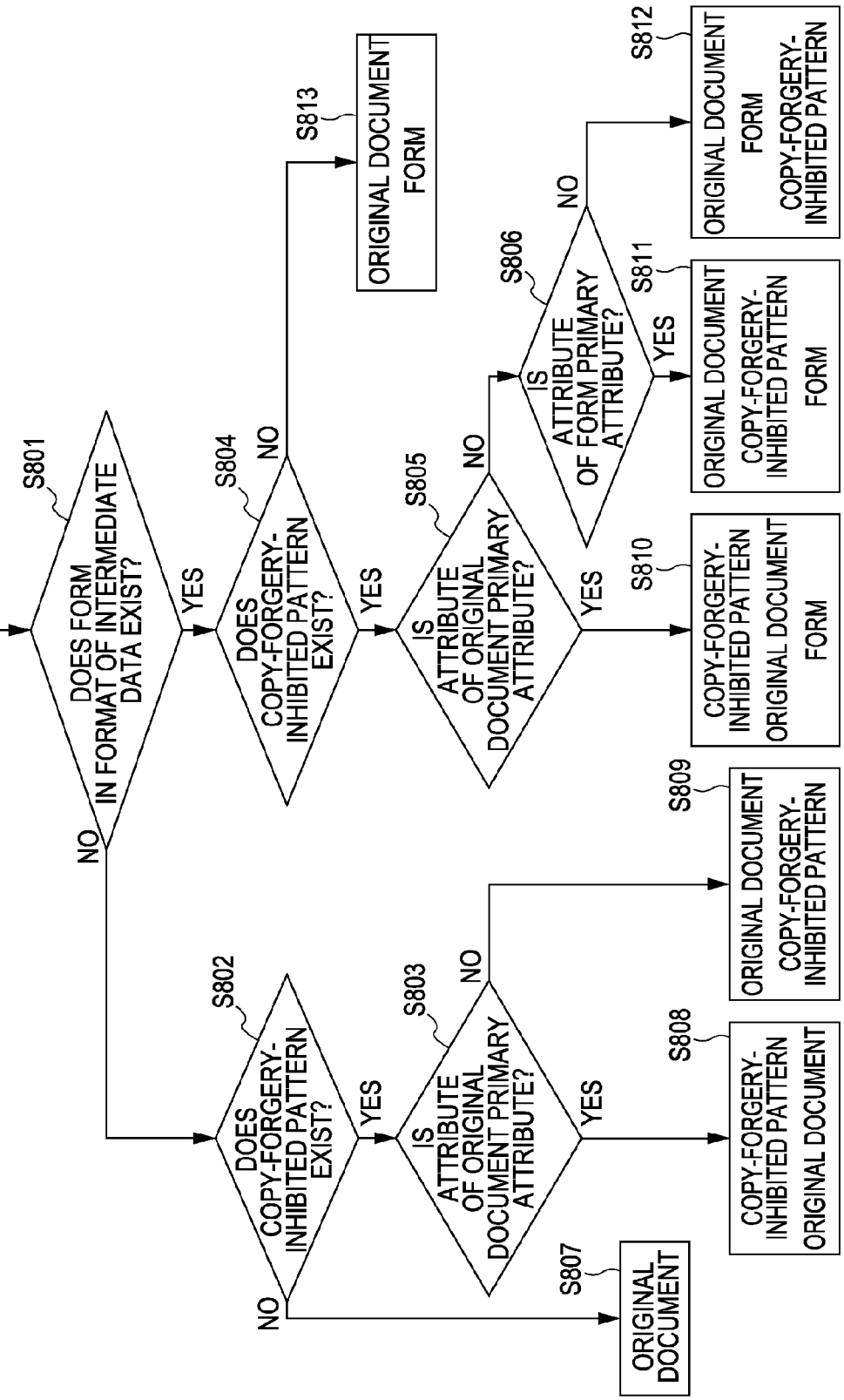
FIG. 8 is a flowchart showing a process of determining the sequence of compositing according to an embodiment of the present invention.

FIG. 8 is a flowchart showing the flow of a process of determining the sequence of compositing in the image generating apparatus 111 according to the present exemplary embodiment, which is performed in step S712.

In step S801, it is determined whether a form image in the format of intermediate data exists in a page to be processed. When it is determined that a form image in the format of intermediate data exists, the process proceeds to step S804. Otherwise, the process proceeds to step S802.

In step S802, it is determined whether a copy-forgery-inhibited pattern image exists in the page to be processed. When it is determined that a copy-forgery-inhibited pattern image exists, the process proceeds to step S803. Otherwise, the process proceeds to step S807.

In step S803, it is determined whether the attribute of an original document image existing in the page to be processed is the primary attribute or the secondary attribute. This determination is performed on the basis of the attribute data of the original document image, which is obtained in step S711. When it is determined that the attribute of the original document image is the primary attribute, the process proceeds to step S808. When it is determined that the attribute of the original document image is the secondary attribute, the process proceeds to step S809.

In step S804, it is determined whether a copy-forgery-inhibited pattern image exists in the page to be processed. When it is determined that a copy-forgery-inhibited pattern image exists, the process proceeds to step S805. Otherwise, the process proceeds to step S813.

In step S805, it is determined whether the attribute of an original document image existing in the page to be processed is the primary attribute or the secondary attribute. This determination is performed on the basis of the attribute data of the original document image, which is obtained in step S711. When it is determined that the attribute of the original document image is the primary attribute, the process proceeds to step S810. When it is determined that the attribute of the original document image is the secondary attribute, the process proceeds to step S806.

In step S806, it is determined whether the attribute of a form image existing in the page to be processed is the primary attribute or the secondary attribute. This determination is performed on the basis of the attribute data of the form image, which is obtained in step S711. When it is determined that the attribute of the form image is the primary attribute, the process proceeds to step S811. When it is determined that the attribute of the form image is the secondary attribute, the process proceeds to step S812.

In step S807, it is determined that only an original document image exists.

In step S808, it is determined that compositing is performed so that a copy-forgery-inhibited pattern image is overlaid on an original document image.

In step S809, it is determined that compositing is performed so that an original document image is overlaid on a copy-forgery-inhibited pattern image.

In step S810, it is determined that compositing is performed so that an original document image is first overlaid on a form image, and then a copy-forgery-inhibited pattern image is overlaid on the resulting image.

In step S811, it is determined that compositing is performed so that a copy-forgery-inhibited pattern image is first overlaid on a form image, and then an original document image is overlaid on the resulting image.

In step S812, it is determined that compositing is performed so that a form image is first overlaid on a copy-forgery-inhibited pattern image, and then an original document image is overlaid on the resulting image.

In step S813, it is determined that compositing is performed so that an original document image is overlaid on a form image.

Details of Compositing

The process of compositing performed in the image generating apparatus 111 according to the present exemplary embodiment in step S713 will now be described.

In the present exemplary embodiment, the sequence of drawing of images is controlled so that the sequence of compositing determined as shown in FIG. 8 is performed.

In the present exemplary embodiment, when it is determined that a certain image is to be overlaid on another image, the certain image is drawn after the other image is drawn.

That is to say, for example, in a case where it is determined as in step S811 that compositing is performed so that an original document image is at the top, a copy-forgery-inhibited pattern image is at the middle, and a form image is at the bottom, when compositing is performed, the form image is first drawn, the copy-forgery-inhibited pattern image is drawn, and then the original document image is drawn.

In the foregoing description of the process of determining the sequence of compositing, the processing of a form image in the bitmap format, which was referred to in the description of step S705, was not described. The process of compositing performed using a form image in the bitmap format will be described next.

In the present exemplary embodiment, when a form image is in the bitmap format, a corresponding original document image and a corresponding copy-forgery-inhibited pattern image are drawn in predetermined order as in step S808 or S809. When no copy-forgery-inhibited pattern image exists, only a corresponding original document image is drawn as in step S807. Then, the drawn images and the form image are combined by performing an OR operation on these images. However, the present invention is not limited to these sequences of compositing. For example, an original document image and a copy-forgery-inhibited pattern image may be drawn on a form image in the bitmap format in predetermined order as in step S808 or S809, or an original document image may be drawn on a form image in the bitmap format as in step S807.

Figure 9:
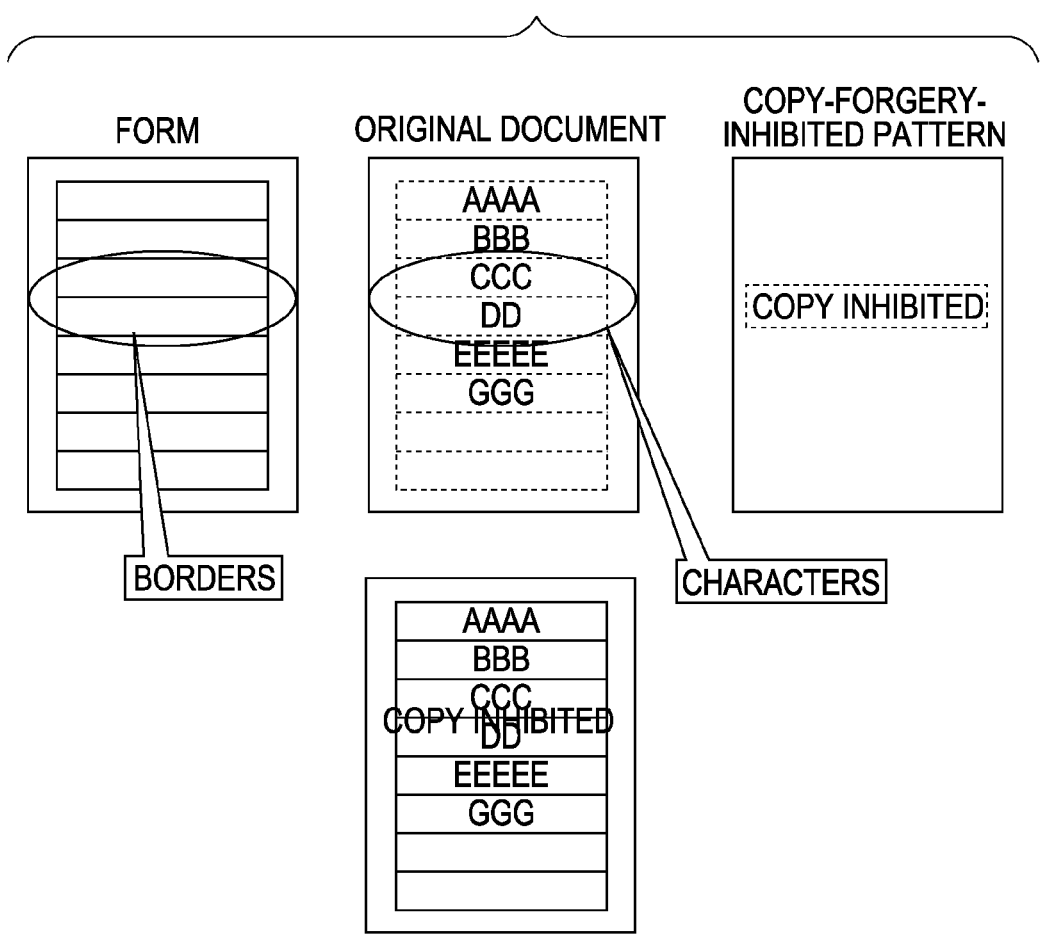
FIG. 9 shows an exemplary result of combining a form image, a copy-forgery-inhibited pattern image, and an original document image and printing the resulting image according to an embodiment of the present invention.
Figure 10:
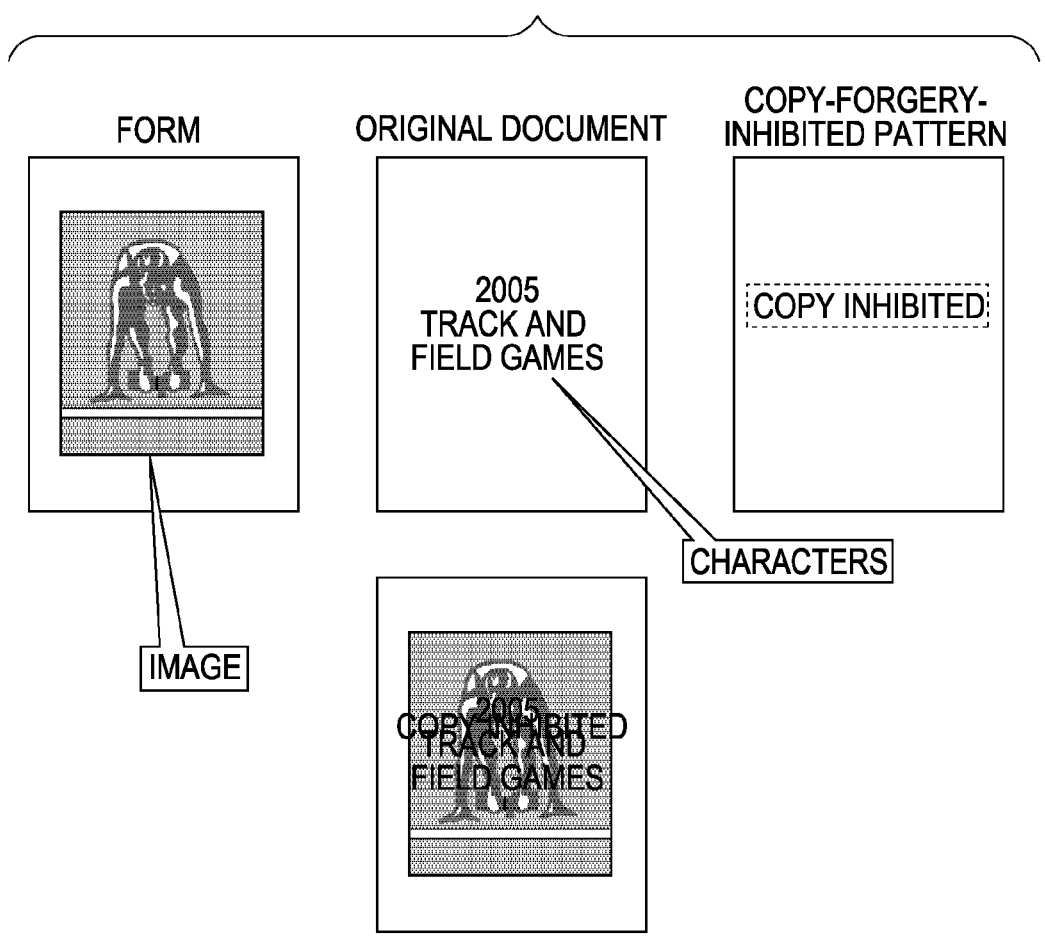
FIG. 10 shows another exemplary result of combining a form image, a copy-forgery-inhibited pattern image, and an original document image and printing the resulting image according to an embodiment of the present invention.

FIGS. 9 and 10 show exemplary results of compositing according to the present exemplary embodiment in a case where a form image is in the format of intermediate data.

In FIG. 9 (corresponding to step S812), a form image includes borders, and an original document image includes characters. In this case, while a copy-forgery-inhibited pattern image may impair the legibility of the borders in the form image and the characters in the original document image, the form image and the original document image do not render the copy-forgery-inhibited pattern image invisible. Thus, compositing is performed so that the form image is first overlaid on the copy-forgery-inhibited pattern image, and then the original document image is overlaid on the resulting image.

In FIG. 10 (corresponding to step S811), an almost entire area of a form image has image attribute, and an original document image includes characters. In this case, when a copy-forgery-inhibited pattern image is drawn under the form image, the copy-forgery-inhibited pattern image is entirely concealed by the form image. Thus, the copy-forgery-inhibited pattern image is drawn on the form image. However, the original document image is drawn on the copy-forgery-inhibited pattern image so as to prevent the copy-forgery-inhibited pattern image from impairing the legibility of the characters in the original document image.

Two cases of image compositing were described above. In the first case, compositing is performed after the sequence in which an original document image, a copy-forgery-inhibited pattern image, and a form image are combined is determined. In the second case, a composite image of an original document image and a copy-forgery-inhibited pattern image is combined with a form image by performing an OR operation on these images. In either case, the quality of a form image is high compared with that in a case where a composite image is simply overlaid on an original document image. Especially in the first case, when the form image has specific attribute, the quality of the form image having been subjected to compositing process is further improved.

This is because, when a composite image is combined with a form image that includes a graphic area that includes, for example, a white part by an OR operation, dots in a corresponding copy-forgery-inhibited pattern image appear in the white part. On the other hand, when an original document image is overlaid on a form image that includes a graphic area that includes, for example, a white part and when the form image is overlaid on a copy-forgery-inhibited pattern image, dots in the copy-forgery-inhibited pattern image do not appear in the white area.

Other Exemplary Embodiments

In the first exemplary embodiment (steps S803, S805, and S806), the attribute of an original document image or a form image is determined on the basis of whether the original document image or the form image includes pixels having specific attribute (e.g., image attribute or graphic attribute). However, the present invention is not limited to this exemplary embodiment. For example, the attribute of an original document image or a form image may be determined on the basis of whether an area of the original document image or the form image that overlaps a copy-forgery-inhibited pattern image includes pixels having specific attribute (e.g., image attribute or graphic attribute). Alternatively, the attribute of an original document image or a form image may be determined on the basis of whether an area of the original document image or the form image that overlaps a latent-image part of a copy-forgery-inhibited pattern image includes pixels having specific attribute (e.g., image attribute or graphic attribute). Alternatively still, in these cases, the attribute of an original document image or a form image may be determined on the basis of whether the number of the pixels having the specific attribute is equal to or more than a predetermined number.

In the description of the first exemplary embodiment, an original document image and a copy-forgery-inhibited pattern image are generated in the host computer 101. However, the present invention is not limited to this exemplary embodiment. For example, a copy-forgery-inhibited pattern image may be generated or registered in advance in the image generating apparatus 111. Furthermore, an original document image need not be generated in the host computer 101 and may be generated by a scanner that is integrated with or separate from the image generating apparatus 111. Alternatively, an original document image may be stored in the image generating apparatus 111 in advance and printed later.

Furthermore, in the description of the first exemplary embodiment, regarding an original document image, a copy-forgery-inhibited pattern image, and a form image, the process of determining the sequence of compositing and the compositing process are performed in the image generating apparatus 111. However, the present invention is not limited to this exemplary embodiment. For example, the process of determining the sequence of compositing may be performed in the host computer 101, and the compositing process may be performed in the image generating apparatus 111. Alternatively, the process of determining the sequence of compositing and the compositing process may be performed in the host computer 101.

Furthermore, in the description of the first exemplary embodiment, the attribute data of an original document image or a form image is determined and obtained in step S711. That is to say, in the first exemplary embodiment, the attribute data is determined and obtained all at once prior to determining the sequence of compositing in step S712. However, in an embodiment of the present invention, the attribute data need not necessarily be determined and obtained all at once prior to determining the sequence of compositing. For example, the attribute data may be determined and obtained in step S803, S805, or S806 in step S712 where the attribute data is necessary, not in step S711. When the attribute data is determined and obtained in steps where the attribute data is necessary in this way, unnecessary processing to determine and obtain the attribute data can be avoided. Thus, high-speed processing can be achieved. For example, when it is determined that the attribute of an original document image is the primary attribute in step S805, the process always proceeds to step S810 regardless of the attribute of a corresponding form image. Thus, in an embodiment, it is unnecessary to obtain the attribute data of the form image in advance.

The present invention is also achieved by an embodiment in which a computer (or a CPU or a micro processing unit (MPU)) included in a system or an apparatus reads and executes program code that is stored in a storage medium and performs the process in the flowcharts shown in the aforementioned exemplary embodiment. In this case, the program code read from the storage medium performs the functions according to the aforementioned exemplary embodiment, and thus an embodiment of the present invention includes the program code and the storage medium, which stores the program code.

The following media can be used as storage media that are used to supply the program code: for example, a floppy disk, a hard disk, an optical disk, a magneto-optical disk, a CD-ROM, a compact disk recordable (CD-R), a magnetic tape, a nonvolatile memory card, and a ROM.

Furthermore, an OS operating on a computer may execute some or all of the actual processing to perform the functions of the aforementioned exemplary embodiment according to instructions from the program code.

Furthermore, the program code read from the storage medium may be written to a memory included in, for example, a function expansion board inserted in a computer or a function expansion unit connected to a computer. Then, for example, a CPU included in the function expansion board, the function expansion unit, or the like may execute some or all of the actual processing to perform the functions of the aforementioned exemplary embodiment according to instructions from the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-323693 filed Nov. 8, 2005, which is hereby incorporated by reference herein in its entirety.

What is claimed is:

1. An apparatus comprising:
   a compositing unit configured to composite, in order from top to bottom, an original document image, a form image and a copy-forgery-inhibited pattern image in a first case, and to composite, in order from top to bottom, a copy-forgery-inhibited pattern image, an original image and a form image in a second case; and
   an outputting unit configured to output an image obtained by the compositing:
   wherein the copy-forgery-inhibited pattern image comprises a latent-image part and a background-image part that becomes pale compared with the latent-image part or disappears so that the latent-image part appears on a copy.

2. The apparatus according to claim 1, further comprising a changing unit configured to change a compositing sequence depending on whether a form image is in a bitmap format or in a PDL format.

3. A control method comprising:
   compositing, in order from top to bottom, an original document image, a form image, and a copy-forgery-inhibited pattern image in a first case, and compositing, in order from top to bottom, a copy-forgery-inhibited pattern image, and original image and a form image in a second case; and
   outputting an image obtained by the compositing;
   wherein the copy-forgery-inhibited pattern image comprises a latent-image part and a background-image part that becomes pale compared with the latent-image part or disappears so that the latent-image part appears on a copy.

4. The control method according to claim 3, further comprising changing a compositing sequence depending on whether a form image is in a bitmap format or in a PDL format.

5. A non-transitory computer-readable storage medium storing a program to cause a computer to execute operations of a control method comprising:
   compositing, in order from top to bottom, an original document image, a form image and a copy-forgery-inhibited pattern image in a first case, and compositing, in order from top to bottom, a copy-forgery-inhibited pattern image, an original image and a form image in a second case; and
   outputting an image obtained by the compositing;
   wherein the copy-forgery-inhibited pattern image comprises a latent-image part and a background-image part that becomes pale compared with the latent-image part or disappears so that the latent-image part appears on a copy.

6. The non-transitory computer-readable storage medium according to claim 5, wherein the control method further comprises changing a compositing sequence depending on whether a form image is in a bitmap format or in a PDL format.

7. A system comprising:
   a compositing unit configured to composite, in order from top to bottom, an original document image, a form image and a copy-forgery-inhibited pattern image in a first case, and to composite, in order from top to bottom, a copy-forgery-inhibited pattern image, an original image and a form image in a second case; and
   an outputting unit configured to output an image obtained by the compositing:
   wherein the copy-forgery-inhibited pattern image comprises a latent-image part and a background-image part that becomes pale compared with the latent-image part or disappears so that the latent-image part appears on a copy.

8. The system according to claim 7, further comprising a changing unit configured to change a compositing sequence depending on whether a form image is in a bitmap format or in a PDL format.

* * * * *